United States Patent [19]

Saito

[11] Patent Number: 4,839,737
[45] Date of Patent: Jun. 13, 1989

[54] FACSIMILE MACHINE WITH A RECORDING PAPER INFORMATION MEMORY

[75] Inventor: Yuichi Saito, Hadano, Japan
[73] Assignee: Ricoh Company, Ltd., Tokyo, Japan
[21] Appl. No.: 235,714
[22] Filed: Aug. 22, 1988

Related U.S. Application Data

[63] Continuation of Ser. No. 72,012, Jul. 10, 1987, abandoned.

[30] Foreign Application Priority Data

Jul. 12, 1986 [JP] Japan ................................. 61-164223

[51] Int. Cl.⁴ ............................................... H04N 1/32
[52] U.S. Cl. .................................... 358/257; 358/256; 358/296
[58] Field of Search ............. 346/76 R; 358/257, 296, 358/304, 256, 285

[56] References Cited

U.S. PATENT DOCUMENTS 4,620,781 11/1986 Miyamoto ........................... 358/285
4,631,596 12/1986 Yaguchi .............................. 358/257
4,679,093 7/1987 Yaguchi .............................. 358/257

Primary Examiner—Howard W. Britton
Attorney, Agent, or Firm—Oblon, Fisher, Spivak, McClelland & Maier

[57] ABSTRACT

A facsimile machine uses a thermal print head for recording data on a roll of thermal sensitive recording paper. The roll of recording paper is wound around a core shaft on which a paper information memory is mounted. The facsimile machine includes a system controller in charge of overall control of the machine and the system controller reads the information stored in the paper information memory. The paper information to be stored includes a size, such as width and length, of the recording paper and a sensitivity of the recording paper. The facsimile machine may transmit the necessary data among the paper information to a transmitter. The facsimile machine may adjust the operating condition of the thermal print head in accordance with the sensitivity information read out of the paper information memory so as to insure production of an excellent recorded image.

10 Claims, 3 Drawing Sheets

, 839,737

FACSIMILE MACHINE WITH A RECORDING PAPER INFORMATION MEMORY

This application is a continuation Ser. No. 072,012 filed on July 10, 1987 now abandoned.

BACKGROUND OF THE INVENTION

1. Field of the Invention

This invention generally relates to a recording paper monitor system for monitoring the status of recording paper for use in recording of data to be recorded, and, in particular, to a facsimile machine having a recording paper information memory which stores status information of the recording paper mounted in the facsimile machine.

2. Description of the Prior Art

As more and more facsimile machines are used, various kinds of recording paper, including thermal or photosensitive paper, are becoming available in the market. For example, such various kinds of recording paper have various sizes, including width and length, and various sensitivities in the case of thermal or photosensitive paper. Many of recent facsimile machines use thermal print heads and thus there is a large demand for thermal or photosensitive paper. However, since the sensitivity differs from paper to paper according to the manufacturing conditions, the photosensitive paper having the right sensitivity must be used in order to obtain printed images of high quality. However, none of the prior art facsimile machines were equipped with a detector for detecting the sensitivity of recording paper so that the recording paper can be known to be of the wrong kind only after having an image recorded thereon. In addition, most of the prior art facsimile machines require to use predetermined sizes of recording paper, so that they are normally equipped with a paper size detector for detecting certain paper sizes, such as A4 and B4, and if such a paper size detector detects the fact that recording paper of wrong size has been set, the detector activates an alarm device. Besides, in the case of roll paper, an end mark is typically provided at the trailing end of the paper so that an alarm signal is generated upon detection of this end mark.

FIG. 3 shows in block form the typical overall structure of a facsimile machine to which the present invention can be advantageously applied. As shown, the facsimile machine generally includes an image reader 1, a transmission buffer memory 2, a recorder 3, a reception buffer memory 4, a coder/decoder 5, a MODEM 6, a net control unit 7, an operation and display unit 8, a system controller 9, and a telephone 10. The image reader 1 is typically comprised of an image sensor, such as a CCD, which has a plurality of photoelectric elements arranged in the form of a single array sufficient in number to optically read an original 11 to be transmitted line by line. As is well known in the art, the longitudinal direction of the array of photoelectric elements and thus of the image sensor defines the main scanning direction of the image reader 1, and there is typically produced a relative motion between the image reader 1 and the original 11 to be transmitted in the auxiliary scanning direction which is normal to the main scanning direction. Thus, in one example, the original 11 is moved relative to the image reader 1 downwardly in FIG. 3 in the auxiliary scanning direction, during which the image reader 1 scans the original 11 in the main scanning direction line by line at a predetermined pitch.

Thus, the visual image information of the original 11 is optically read by the image reader 1 and thus converted into an electrical image information. This electrical image information is typically subjected to a predetermined image signal processing, such as shading correction and binary conversion, at the image reader 1 and then output as image information to the transmission buffer memory 2. The transmission buffer memory 2 is typically comprised of a semiconductor memory and it temporarily stores the image information supplied from the image reader 1.

Also provided in the facsimile machine is the recorder 3 as an output means for recording received facsimile information on a sheet of recording paper 12, and the recorder 3 typically includes a plotter or any other type of printer, such as a thermal printer using a thermal print head and a laser printer. In the case of a facsimile machine, use is often made of thermal printers because they are small in size, durable, low at cost, and easy to maintain. In the case of using a thermal printer, use must be made of thermal or photosensitive paper for the recording paper 12. Alternatively, use may also be made of plain paper if use is also made of photosensitive tape as sandwiched between the plain paper and the thermal print head. The reception buffer memory 4 receives facsimile data which has been received and decoded and stores the facsimile data temporarily before being supplied to the recorder 3.

The coder/decoder 5 has a dual mode of operation. During transmission mode, the coder/decoder 5 encodes the image information supplied from the transmission buffer memory 2, thereby carrying out compression of data, for example, by the MH or MR method. On the other hand, during reception mode, the coder/decoder 5 decodes the received facsimile data to reconstruct the original image information to be sent to the recorder 3 via the reception buffer memory 4.

The MODEM 6 is provided to modulate the encoded facsimile data from the coder/decoder in a format suitable for transmission and also to demodulate the facsimile data upon reception before supplying the facsimile data to the coder/decoder 5. The net control unit 7 is provided to control a connecting condition with a transmission line and also the transmission and reception of a transmission procedure. The operation and display unit 8 is provided with various operational keys and displays, through which various information and instructions, such as telephone number of a receiver station to which data is to be sent, commands to initiate transmission, and operational commands to the reader 1 or the recorder 3, are supplied to the system controller 9. And, thus, this operation and display unit 8 serves as a man-machine interface in controlling the operation of the facsimile machine. The system controller 9 is typically comprised of a microcomputer and in charge of the overall control of the facsimile machine.

With the above-described structure, the original 11 is optically read by the image reader 1 and its image information is encoded, modulated and transmitted to a receiver facsimile machine at a remote station. On the other hand, when the facsimile machine received a transmitted facsimile signal, it is demodulated, decoded and recorded on the recording paper 12 by means of the recorder 3. In such a facsimile machine, however, the recording paper 12, such as roll paper, sheet paper or any other type, which is set in the recorder 3, cannot supply information regarding its size, width and length, and sensitivity by itself to the system controller 9.

Therefore, the recorder 3 is typically provided with a A4 or B4 size detector for detecting the width of the recording paper 12 and an end detector for detecting the end mark provided near the end of roll paper. However, a detector for detecting the sensitivity of the recording paper 12 is not known and thus there is no way for detecting the sensitivity of the recording paper 12 automatically. Thus, the operator must determine the sensitivity of the recording paper 12 by inspecting its wrapping paper or the like before setting.

SUMMARY OF THE INVENTION

In accordance with the present invention, there is provided a facsimile machine which uses a recording medium, typically paper, provided with a paper information memory for storing information, such as paper size and/or sensitivity, and which includes paper information reading means for reading the paper information stored in the paper information memory. Thus, when the facsimile machine receives facsimile data from a transmitter at a remote place, the facsimile machine sends the paper size information to the transmitter. Furthermore, when the paper information memory stores the sensitivity of the recording medium, this sensitivity information is read by the paper information reading means and the recording operation for recording data on the recording medium is carried out under the condition suitable for the detected sensitivity of the recording medium.

It is therefore a primary object of the present invention to obviate the disadvantages of the prior art as described above and to provide an improved facsimile machine which uses a recording medium having a paper information memory.

Another object of the present invention is to provide an improved facsimile machine which can detect the sensitivity of a recording medium set in position for use.

A further object of the present invention is to provide an improved facsimile machine which can record an image on a recording medium under a condition which is adjusted depending on the detected sensitive of the recording medium set in position for use.

A still further object of the present invention is to provide an improved facsimile machine which allows to monitor the current condition of the recording medium in use.

A still further object of the present invention is to provide an improved facsimile machine capable of insuring to provide an excellent hard copy at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
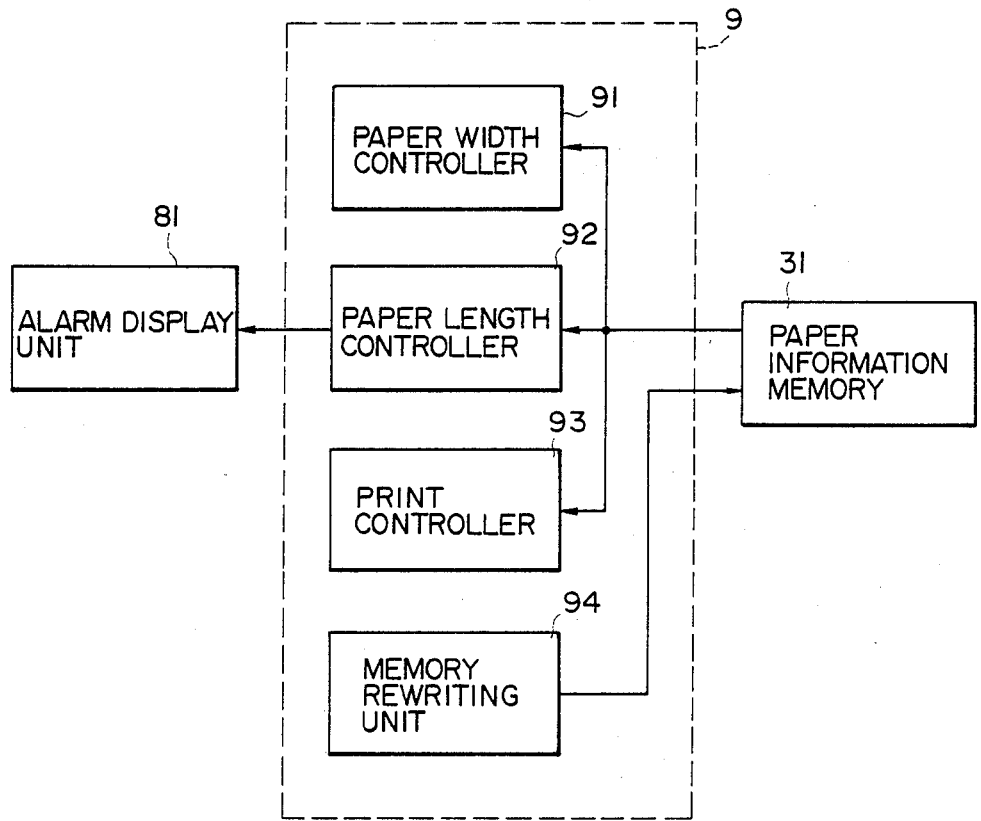
FIG. 1 is a paper information processing system suitable for incorporation into a facsimile machine constructed in accordance with one embodiment of the present invention.
Figure 3:
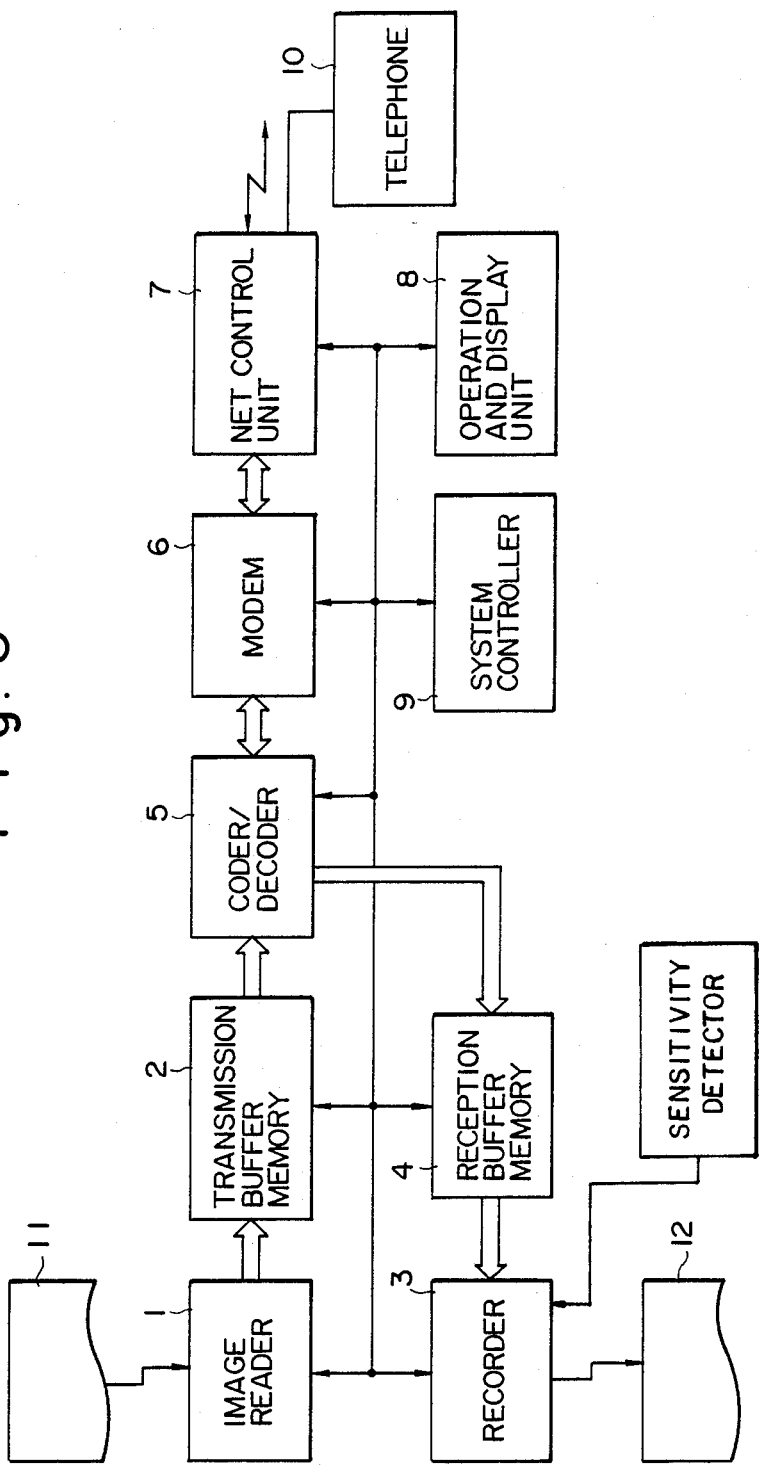
FIG. 3 is a block diagram showing the overall structure of a typical facsimile machine to which the present paper information processing system may be incorporated advantageously.

Referring now to FIG. 1, there is schematically shown a paper information processing system suitable for use in a facsimile machine constructed in accordance with one embodiment of the present invention. As shown, the present paper information processing system includes a system controller 9 which corresponds to the system controller 9 provided in the facsimile machine shown in FIG. 3. The system controller 9 of FIG. 1 includes a paper width controller 91, a paper length controller 92, a printer controller 93 and a memory rewriting unit 94. The present paper information processing system also includes a paper information memory 31 and an alarm display unit 81; however, these two elements are not provided within the system controller 9. The paper information memory 31 is mounted on the recording medium 12 to be set in the recorder 3 in the facsimile machine shown in FIG. 3. For example, the paper information memory 31 may be mounted on a core shaft around which lengthy recording paper 12 is wound in the form of a roll. The alarm display unit 81 has a purpose of displaying an alarm signal based on the result of detection of the recording medium 12 set in the recorder 12 and it may be provided in the operation and display unit 8 of the facsimile machine shown in FIG. 3.

Described more in detail with respect to the paper information memory 31, it is preferably comprised of a semiconductor memory which stores various information regarding the recording paper 12, such as width and length and thermal sensitivity, and it is preferably mounted on a core shaft around which the recording paper 12 is wound in the form of a roll. In the preferred embodiment, the paper information memory 31 is comprised of an electrically eraseable programmable read only memory or EEPROM for short, which is not volatile so that it can retain information without using a back-up battery. Alternatively, the paper information memory 31 may be comprised of a read only memory or RAM for short, which needs a back-up battery for retaining stored information.

The paper width controller 91 provided in the system controller 9 reads out the paper information stored in the paper information memory 31 and it transmits this information to a transmitter facsimile machine in communication during a protocol session. Thus, the transmitter facsimile machine knows the conditions of the recording paper 12 available for recording at the present facsimile machine. Similarly, the paper length controller 92 reads out the paper length information stored in the paper information memory 31 and it determines whether or not the recording paper 12 now set in the recorder 3 has a sufficient length to record all of the facsimile image information received. For example, in the case where the remaining amount of recording paper 12 is stored as the paper length information in the paper information memory 31, it is checked whether the detected remaining amount is larger than a first predetermined value or not. And, if the detected remaining amount has been found to be smaller than the first predetermined value, a detection signal is supplied to the alarm display unit 81 to generate an alarm signal indicating the fact that the recording paper 12 is not much left and needs to be replaced with a new roll soon. In addition, in the case when the detected remaining amount is smaller than the first predetermined amount, it is checked whether the detected remaining amount is larger than a second predetermined amount which indicates the fact that the recording paper 12 is very little left and thus needs to be replaced with a new roll of recording paper as soon as possible. Thus, when the detected remaining amount is less than the second predetermined amount, an indication of no recording paper is displayed at the alarm display unit 81.

The print controller 93 reads out the paper sensitivity information stored in the paper information memory 31 and controls the recording condition, such as duration or frequency of application per unit time of a heat pulse, so as to insure that an excellent hard copy can be obtained. The memory rewriting unit 94 has a function of updating the paper information, such as the remaining length of recording paper 12, stored in the paper information memory 31. For example, every time when one page of recording operation has been completed, the information indicating the remaining length of the recording paper 12 is read out of a paper length information storing area of the paper information memory 31 and subtracts the length corresponding to one page therefrom and the new length information thus obtained is written into the paper information memory 31. As a result, the paper length information stored in the paper information memory 31 is constantly updated, which allows to carry out an accurate and proper control over the recording paper 12 at all times.

Figure 2:
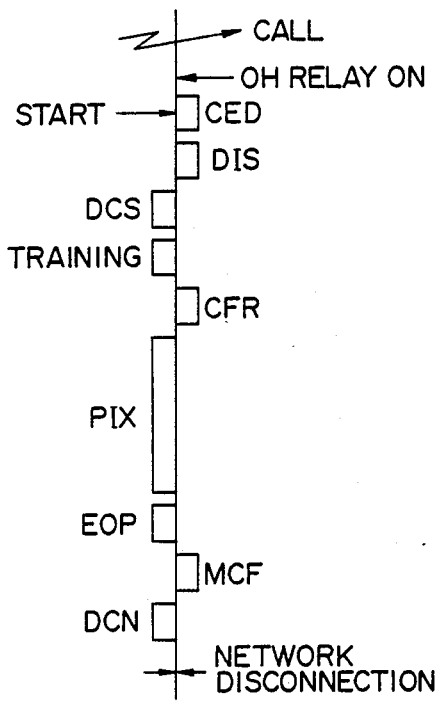
FIG. 2 is an illustration showing a procedure in facsimile communication.

Referring now to FIG. 2, a communication operation and a paper information processing operation to be carried out by the present facsimile machine having the above-described structure will be described. It is to be noted that FIG. 2 illustrates a facsimile communication procedure and the left-hand side is for a transmitter with the right-hand side for a receiver.

In order to carry out a facsimile communication, a transmitter places a call to a receiver. Upon receipt of this call at the receiver, the paper length controller 92 reads the paper length information stored in the paper information memory 31. If the paper length information thus read is larger than a predetermined length, then the receiver turns on its OH relay, thereby switching a circuit from a telephone line to a facsimile machine. If the paper length thus read out is less than the predetermined length, the OH relay is not turned on. Upon turning on of the OH relay, the receiver sends a DIS signal to the transmitter to apprise the function of the receiver to the transmitter. In this case, at the receiver, the paper width controller 91 reads the paper width information from the paper information memory 31 and inserts this paper width information in the DIS signal to be sent to the transmitter. Thus, the transmitter receives the DIS signal and checks the function of the receiver, and, then, sends a DCS signal to the receiver, thereby apprising the receiver of transmitting parameters. Thereafter, the transmitter sends out a training pattern to the receiver.

The receiver checks the training pattern sent from the transmitter and, if acceptable, sends a CFR signal to the transmitter, thereby establishing a reception condition for receiving image information. The transmitter, upon receipt of the CFR signal from the receiver, initiates transmission of image information. In this manner, a facsimile communication is carried out.

Next, the operation of the receiver during reception of image information transmitted from the transmitter will be described below. The printer controller 93 reads the paper sensitivity information from the paper information memory 31 and adjusts the pulse width of a heat or print pulse to be applied to the thermal print head of the recorder 3 depending on the sensitivity of the recording paper 12. Upon completion of one page of image information on the recording paper 12, the memory rewriting unit 94 writes the remaining paper length information stored in the paper information memory 31 by reading the paper length information stored in the paper information memory 31, subtracting a length corresponding to one page of image data recorded on the recording paper 12 from the paper length information read to calculate the current paper length information of the remaining amount of the recording paper 12, and writing this calculated new paper length information into the paper information memory 31.

Thereafter, the paper length controller 92 reads the paper length information now stored in the paper information memory 31 and checks whether the current paper length thus read indicates near the end of the recording paper 12, almost no recording paper 12 left or a sufficient amount for further recording. If it has been detected to be a near end condition, then the corresponding alarm signal is displayed at the alarm display unit 81 to indicate the fact that the recording paper 12 soon needs to be replaced with a new roll of recording paper 12. If it has been detected to be an almost no paper condition, the corresponding alarm signal is displayed at the alarm displaying unit 81 to indicate the fact that the recording paper 12 must be replaced with a new roll of recording paper 12 immediately.

Upon completion of transmission of image information, the transmitter sends a message command to the receiver in succession. For example, if it is a single page transmission, then an EOP signal is sent to the receiver. Upon receipt of this EOP signal at the receiver, the paper length controller 92 reads the paper length information stored in the paper information memory 31 and, depending on the paper length information thus read, supplies a post-message response to the transmitter. For example, if the detected paper length information indicates a sufficient amount of the remaining recording paper 12 or near end level, then an affirmative response, such as MCF, RTP or PIP, is supplied to the transmitter. On the other hand, if the detected paper length information indicates the no paper condition, then a negative response, such as RTN or PIN, is supplied to the transmitter. When the transmitter receives this post-message response, it sends a DCN signal to have it disconnected from the transmission line.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:
1. A facsimile machine comprising:
 image reading means for optically reading an original;
 transmitting means for transmitting an original image read by said image reading means;
 receiving means for receiving data transmitted from a remote transmitter;
 recording means for recording said data received by said receiving means, wherein said recording means comprises a storage means for storing a supply of recording paper and further wherein said recording means is provided with an electronic paper information storing means which is part of said receiving paper storage means for electronically storing predetermined information regarding said recording paper stored in said recording means; and controlling means associated with each of the above-mentioned means for controlling the overall operation of said facsimile machine, said controlling means being capable of reading said predetermined information stored in said electronic paper information storing means in controlling the overall operation of said facsimile machine.

2. The facsimile machine of claim 1, wherein said predetermined information includes a sensitivity of said recording paper stored in said recording means.

3. The facsimile machine of claim 2, wherein said controlling means adjusts a recording condition of said recording means in response to the sensitivity read by said controlling means.

4. The facsimile machine of claim 1, wherein said predetermined information includes a sensitivity of said recording paper stored in said recording means.

5. The facsimile machine of claim 4, wherein said size information includes a size and length of said recording paper stored in said recording means.

6. The facsimile machine of claim 3, wherein said controlling means updates the length information stored in said paper information storing means as said recording means consumes said supply of said recording paper.

7. The facsimile machine of claim 1, wherein said recording paper is in the form of a roll which is wound around a core shaft, and said paper information storing means is mounted on said core shaft.

8. The facsimile machine of claim 7, wherein said electronic paper information storing means includes a semiconductor memory.

9. The facsimile machine of claim 8, wherein said semiconductor memory is an EEPROM.

10. The facsimile machine of claim 8, wherein said semiconductor memory is a RAM.

* * * * *